United States Patent [19]

Curtis

[11] 4,381,150
[45] Apr. 26, 1983

[54] LASER BEAM POINTING AID

[75] Inventor: Richard A. Curtis, Huntsville, Ala.

[73] Assignee: The United States of America as represented by the Secretary of the Army, Washington, D.C.

[21] Appl. No.: 248,376

[22] Filed: Mar. 27, 1981

[51] Int. Cl.³ .............................................. G01B 11/27
[52] U.S. Cl. ..................................... 356/247; 356/153
[58] Field of Search ................... 356/153, 154, 247, 4, 356/5, 152; 350/10; 33/233, 234, 241, 245, 251, DIG. 21

[56] References Cited

U.S. PATENT DOCUMENTS

| | | | |
|---|---|---|---|
| 2,981,003 | 4/1961 | Lindberg | 356/247 |
| 3,499,713 | 3/1970 | Ito | 356/138 |
| 3,533,700 | 10/1970 | Alexander | 356/153 X |
| 3,711,204 | 1/1973 | Steck | 356/153 |
| 3,782,832 | 1/1974 | Hacskaylo | 356/153 |
| 4,112,300 | 9/1978 | Hall, Jr. et al. | 356/138 X |
| 4,260,254 | 4/1981 | Braun | 356/153 X |

*Primary Examiner*—John K. Corbin
*Assistant Examiner*—Matthew W. Koren
*Attorney, Agent, or Firm*—Nathan Edelberg; Robert P. Gibson; James T. Deaton

[57] ABSTRACT

A laser beam pointing aid for field testing of breadboard laser systems and utilizing a hollow housing with apertures at each end and with crosshairs at one end of the housing and a telescope adjustably mounted to the hollow housing and being positionable relative to an output beam from a laser system to allow one to utilize the last mirror of the laser system and the laser beam pointing aid to accurately point the laser beam to a target.

3 Claims, 4 Drawing Figures

LASER BEAM POINTING AID

DEDICATORY CLAUSE

The invention described herein may be manufactured, used, and licensed by or for the Government for governmental purposes without the payment to me of any royalties thereon.

BACKGROUND OF THE INVENTION

Since infrared light is invisible to the unaided eye, it is necessary to use an auxillary means of alignment in pointing an infrared wavelength laser toward a target. A common structure for pointing such an infrared laser beam is to use a rifle scope mounted on the laser chassis and boresighting the laser beam axis with the scope over a short range. This of course is not satisfactory when operating with a laser beam which has to be reflected by beam splitter and/or mirrors since these devices require precision alignment of other mirrors for a visible path which is parallel to the laser beam axis. That is, there is need for a device that can be mounted independent of the laser and the beam splitters and/or mirrors which can be used in aligning a laser beam on a target.

Therefore, it is an object of this invention to provide a simple laser beam pointing aid that can be used to mechanically align a laser beam by utilizing a telescope mounted on an elongated rigid housing with an aperture at one end and with crosshairs provided at the other end for alignment purposes.

Another object of this invention is to provide a simple auxillary laser beam pointing aid that can be used with various diameters from laser beam sources.

Still another object of this invention is to provide a simple laser beam pointing aid that can be used to accurately train the laser beam on a specific target.

Yet another object of this invention is to provide a laser beam pointing aid that can be used with any wavelength laser by simple changing of an aperture of the pointing aid.

Other objects and advantages of this invention will be obvious to those skilled in this art.

SUMMARY OF THE INVENTION

In accordance with this invention, a laser beam pointing aid is provided which includes an elongate rigid and hollow housing that has an aperture at one end and a set of removable crosshairs at the other end with a telescope mounted relative to the rigid housing so as to allow the telescope optical axis to be boresighted and aligned with an axis of the rigid hollow housing to allow the laser beam pointing aid to be utilized with an output beam from a laser source and a universally mounted mirror that controls the reflection of the laser beam from the laser source to controlably train with the laser beam pointing aid the laser beam to a given target.

DESCRIPTION OF THE PREFERRED EMBODIMENT

Figure 1:
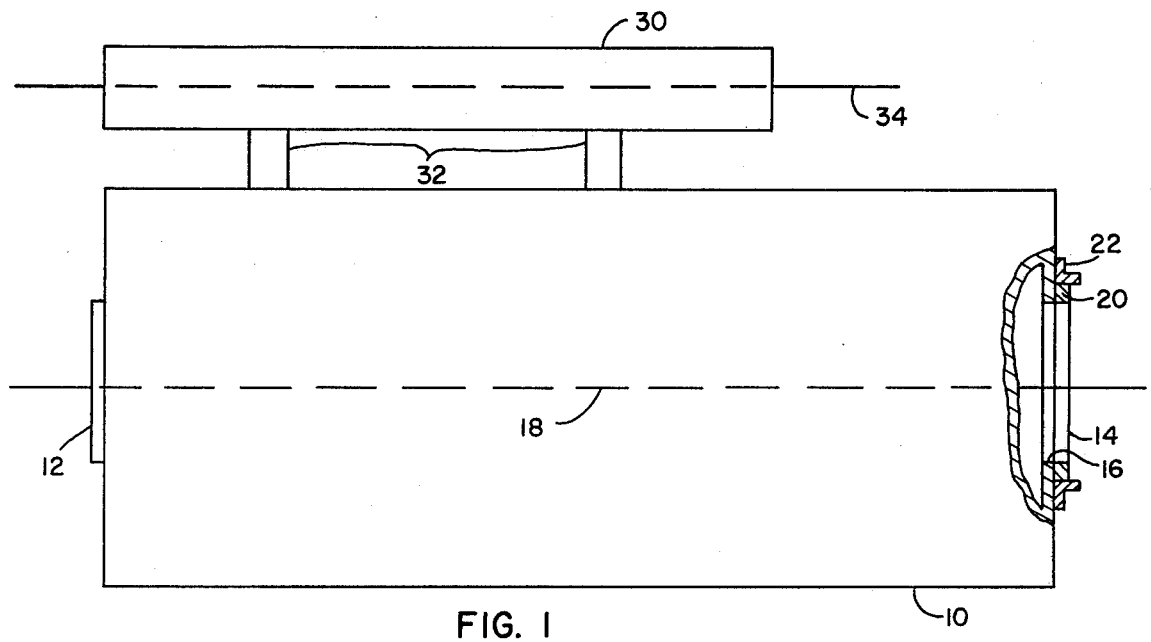
FIG. 1 is a schematic illustration of the laser beam pointing aid in accordance with this invention.
Figure 2:
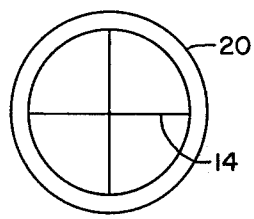
FIG. 2 is an illustration of crosshairs and their mounting structure.
Figure 3:
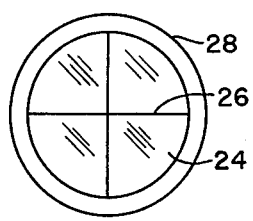
FIG. 3 is an illustration of thermal material and crosshairs for use in aligning the laser beam.
Figure 4:
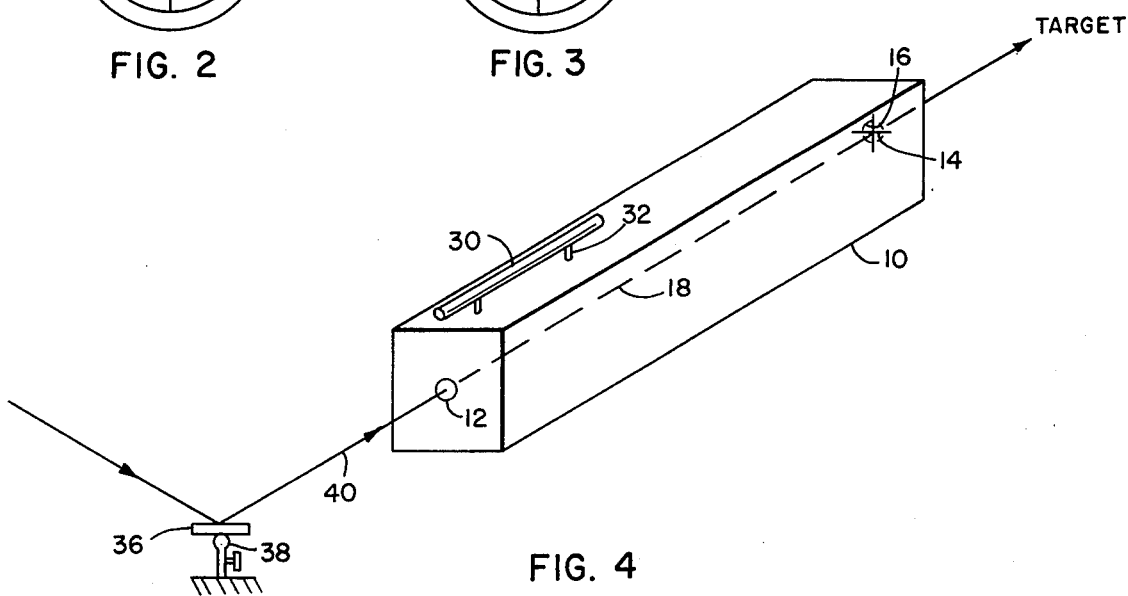
FIG. 4 is a schematic illustration of the laser beam pointing aid being utilized with a laser beam and universally mounted mirror to train the laser beam and accurately align the laser beam on a target.

Referring now to FIG. 1, a schematic illustration of this invention is illustrated and includes a rigid hollow housing 10 that has an input aperture 12 such as an adjustable iris so that the diameter of the aperture opening can be varied depending upon the area cross section of the laser beam that is being trained on a target. The opposite end of housing 10 has a removable "crosshairs" 14 over an aperture 16 in housing 10. Aperture 12 and the center of crosshairs 14 are aligned along axis 18. Crosshairs 14 as illustrated in FIG. 2 are mounted on ring 20 and are adapted to be inserted and removed from housing 10 by mounting brackets 22 only two of which are illustrated. Mounting brackets 22 and ring 20 have very close tolerances so that crosshairs 14 can always be accurately repositioned relative to aperture 16 and center line axis 18. Crosshairs 14 are utilized for boresighting the device. After the device has been boresighted, ring 20 with crosshairs 14 is removed from over aperture 16 of housing 10 and thermal material 24 (See FIG. 3) and crosshairs 26 are mounted on ring 28 and inserted into brackets 22 to be utilized for accurately aligning the laser beam along center line 18 of housing 10 as will be described herein below. A telescope 30 is mounted in a conventional manner by schematically illustrated means 32 for adjusting telescope 30 in a conventional manner relative to elongated housing 10 and allowing telescope 30 to be boresighted in a conventional manner to align center line axis 34 of the telescope with center line axis 18 of elongated housing 10. Crosshairs 14 of ring 20 are required in the boresighted alignment of center line axis 34 with center line axis 18. That is, center line 18 and crosshairs 14 are arranged for center line axis 18 to pass exactly where crosshairs 14 intersect and cross one another. Referring now to FIG. 4, the laser beam pointing aid of FIG. 1 is adapted for utilization with a laser beam from an optical source as illustrated and utilizing a last mirror 36 of the optical system from the laser beam source. Optical mirror 36 has conventional universal mounting means 38 for adjusting mirror 36 in three dimensions for accurately aligning laser beam output at 40 with center line axis 18 of elongated housing 10. Optical mirror 36 and housing 10 are positioned about 30 centimeters apart for allowing accurate aligning of the laser beam output.

In operation, alignment is accomplished by roughly aligning the laser beam pointing aid with the output beam 40 from the laser source, then utilizing telescope 30 to precisely align the laser beam pointing aid relative to a distant target and then mirror 36 is utilized by being adjusted to accurately align output 40 relative to input aperture 12 and crosshairs 26 on thermal material 24 with ring 28 in place relative to brackets 22 to enable one to accurately adjust output beam 40 along center line axis 18 of housing 10. After mirror 36 has been adjusted to align output 40 with center line axis 18 of housing 10, thermal material 24 on ring 28 is removed from brackets 22 and at this time the output laser beam 40 is accurately trained on the distant target as desired. In aligning output 40 relative to input aperture 12 one may use a thermal material device similar to the device illustrated in FIG. 3 to align output 40 relative to aperture 12 and this is especially needed if output 40 is an invisible beam. The thermal material allows one to visually determine exactly where laser beam output 40 is trained by reflection from mirror 36.

As can be seen, a simple laser beam pointing aid is needed with many laser beam outputs in order to provide a means for accurately training the laser output to a fixed target. Obviously, a large laser is limited in the amount of adjustment it can have. Therefore, it can be seen that a simple laser beam pointing aid can be located at a position which is convenient to the laser system output and then accurately pointed at a remote target utilizing the telescope to accurately point the laser beam pointing aid and then accurately aligning the laser beam utilizing the adjustable mirror to precisely train the laser beam output to a target. Devices of this nature are desperately needed in checking out and testing many lasers and optical systems that are being developed. The thermal material 24 is conventional thermal image plates that are well known in the art for glowing and indicating the shape and position or pattern of a given laser beam. Obviously, the thermal material has to be compatible with the particular wavelength output of the laser that is to be trained on the target. The laser beam pointing aid of this invention allows one to accurately point a laser beam output to a given target in a specific position and accuracy in accomplishing this is very much improved over prior capabilities. Therefore, it can be clearly seen that this invention provides a simple laser beam pointing aid that can be utilized to accurately point a laser beam to a remote target (up to a few kiloimeters away). It is also pointed out that this invention can be used with raw laser beams or more specifically with beams which have been multiply reflected by mirrors or beam splitters.

I claim:

1. A device for pointing a laser beam to a remote target comprising an elongated housing having an adjustable iris as an input aperture at one end and an output aperture at an opposite end, a center line axis through said housing and said input and output apertures, an unobstructed path through said housing along said center line axis of said housing for passing a laser beam therethrough, a telescope, means mounting said telescope relative to said housing, a center line axis through said telescope, and said means mounting said telescope being such to allow one to boresight said telescope and align the center line axis of the telescope with the center line axis of said housing.

2. A device as set forth in claim 1, wherein said output aperture has mounting brackets therearound for allowing a ring with crosshairs thereon to be accurately positioned relative to said output aperture for aiding in boresighting the center line axis.

3. A device as set forth in claim 1, wherein said device is mounted beside a universally mounted mirror that is designed to be adjusted in three dimensions and reflect an output laser beam through said input and output apertures along said center line axis of said housing.

* * * * *